United States Patent
Kinnan et al.

(10) Patent No.: US 11,446,909 B2
(45) Date of Patent: Sep. 20, 2022

(54) HIGH-SLIP STRETCH FILM

(71) Applicant: Berry Plastics Corporation, Evansville, IN (US)

(72) Inventors: Michael A. Kinnan, North Canton, OH (US); Brooke D. Kitzmiller, North Canton, OH (US)

(73) Assignee: Berry Plastics Corporation, Evansville, IN (US)

( * ) Notice: Subject to any disclaimer, the term of this patent is extended or adjusted under 35 U.S.C. 154(b) by 496 days.

(21) Appl. No.: 16/222,213

(22) Filed: Dec. 17, 2018

(65) Prior Publication Data

US 2019/0118518 A1  Apr. 25, 2019

Related U.S. Application Data

(63) Continuation of application No. 14/214,072, filed on Mar. 14, 2014, now abandoned.

(60) Provisional application No. 61/785,480, filed on Mar. 14, 2013.

(51) Int. Cl.

| | |
|---|---|
| *B32B 27/32* | (2006.01) |
| *B32B 27/08* | (2006.01) |
| *B32B 27/30* | (2006.01) |
| *B32B 27/20* | (2006.01) |
| *B32B 7/10* | (2006.01) |
| *B65D 19/44* | (2006.01) |

(52) U.S. Cl.
CPC ............ *B32B 27/32* (2013.01); *B32B 7/10* (2013.01); *B32B 27/08* (2013.01); *B32B 27/20* (2013.01); *B32B 27/302* (2013.01); *B32B 27/327* (2013.01); *B65D 19/44* (2013.01); *B32B 2250/05* (2013.01); *B32B 2250/24* (2013.01); *B32B 2270/00* (2013.01); *B32B 2307/4026* (2013.01); *B32B 2307/554* (2013.01); *B32B 2307/584* (2013.01); *B32B 2307/744* (2013.01); *B32B 2307/746* (2013.01); *B32B 2553/00* (2013.01); *B32B 2553/02* (2013.01); *Y10T 428/31913* (2015.04)

(58) Field of Classification Search
CPC ...... C08L 23/06; C08L 23/08; C08L 23/0815; C08L 25/04; C08L 25/06; C08L 2666/06; C08L 2205/03; B32B 27/08; B32B 27/32; B32B 27/302; B32B 2250/03; B32B 2250/242; B32B 2307/744; B32B 2307/746; B32B 2270/00
See application file for complete search history.

(56) References Cited

U.S. PATENT DOCUMENTS

| | | |
|---|---|---|
| 4,579,912 A | 4/1986 | Canterino |
| 4,716,201 A | 12/1987 | Canterino |
| 4,804,564 A | 2/1989 | Dobreski |
| 4,820,589 A * | 4/1989 | Dobreski .............. B32B 7/02 428/422 |
| 4,957,679 A | 9/1990 | Moore |
| 5,093,188 A | 3/1992 | Dohrer |
| 5,114,763 A | 5/1992 | Brant |
| 5,847,042 A * | 12/1998 | Hosoda .................. C08L 23/02 524/506 |
| 6,045,902 A | 4/2000 | Imanishi |
| 6,482,532 B1 | 11/2002 | Yap |
| 2006/0237883 A1 * | 10/2006 | Jaeger .................. B32B 27/32 264/564 |
| 2008/0038571 A1 | 2/2008 | Klitzmiller |
| 2008/0311366 A1 | 12/2008 | Tukachinsky |
| 2008/0311368 A1 | 12/2008 | Tukachinsky |
| 2010/0129632 A1 | 5/2010 | Eichbauer |
| 2012/0219813 A1 | 8/2012 | Vignola |

FOREIGN PATENT DOCUMENTS

| | | |
|---|---|---|
| CA | 2581686 | 4/2006 |
| CA | 2631354 | 12/2008 |
| EP | 0148567 A1 | 7/1985 |
| WO | 2006043919 | 4/2006 |

OTHER PUBLICATIONS

Simpson, Ethylene Polymers, LLD PE, 2001, Encyclopedia of Polymer Science and Technology, vol. 2, pp. 441-482. (Year: 2001).
Extended EP Search Report completed Oct. 22, 2014 and issued in connection with European Patent Application No. 14159934.0, 6 pages.

* cited by examiner

*Primary Examiner* — Monique R Jackson
(74) *Attorney, Agent, or Firm* — Barnes & Thornburg LLP

(57) ABSTRACT

A multi-layer stretch wrap film has three or more layers, including at least one outer non-cling layer, at least one inner core layer, and at least one outer cling layer, where the film displays enhanced non-cling properties after being stretched.

19 Claims, No Drawings

HIGH-SLIP STRETCH FILM

PRIORITY CLAIM

This application is a continuation of U.S. application Ser. No. 14/214,072, filed Mar. 14, 2014, which claims priority under 35 U.S.C. § 119(e) to U.S. Provisional Application No. 61/785,480, filed Mar. 14, 2013, each of which is expressly incorporated by reference herein.

BACKGROUND

The present disclosure relates to polymeric materials that can be formed into a multi-layer stretch wrap film. More particularly, the present disclosure relates to a stretch wrap film that can be used to hold goods to pallets during storage and/or shipping.

SUMMARY

A multi-layer stretch film in accordance with the present disclosure includes three or more layers. The film has at least one outer non-cling layer, at least one inner core layer, and at least one outer cling layer.

In illustrative embodiments, a multi-layer stretch film in accordance with the present disclosure has at least one first layer, which is an outer non-cling layer that includes a mixture of polyethylene and polystyrene, at least one second layer, which is a core layer that includes at least one polyolefin, and at least one third layer, which is an outer cling layer that includes a polymer selected from the group consisting of polyethylene, plastomer, polyisobutylene, and mixtures thereof.

In illustrative embodiments, a multi-layer stretch film in accordance with the present disclosure displays enhanced non-cling properties after being stretched, thereby permitting thick films requiring substantial stretching force to be stretched that would otherwise slip through stretching equipment without being stretched.

In illustrative embodiments, a multi-layer stretch film in accordance with the present disclosure has a non-cling surface, which surface generally does not cling to itself and prevents adjoining pallets wrapped therewith from sticking together, and an opposing cling surface, which surface enables the film to stick to itself.

In illustrative embodiments, a multi-layer stretch film in accordance with the present disclosure undergoes self-sealing when portions of the film are overlapped during the process of, for example, palletizing loads where it is desirable to hold or wrap an article(s) and/or hold goods securely to pallets during subsequent storage and shipping.

In illustrative embodiments, a multi-layer stretch film in accordance with the present disclosure optimizes physical properties thereby enabling such films to exhibit superior abrasion resistance in order to protect wrapped contents from damage and exposure during shipment, good cling in order to eliminate the need for taping of such films in order to secure the contents, and good non-cling in order to prevent adjoining film-wrapped pallets from sticking to one another.

Additional features of the present disclosure will become apparent to those skilled in the art upon consideration of illustrative embodiments exemplifying the best mode of carrying out the disclosure as presently perceived.

DETAILED DESCRIPTION

The present disclosure relates to stretch films with an optimized balance of beneficial properties. In particular, the stretch films of the present disclosure have a low coefficient of friction on their outer non-cling layer, thereby imparting superior non-cling properties, and superior abrasion resistance and cling properties, thereby rendering the films suitable for stretch-wrapping applications. Illustratively, the stretch films of the present disclosure have three or more layers including, but not limited to, a core layer, an outer or skin cling layer and an outer or skin non-cling layer.

Illustrative embodiments of a multi-layer stretch film in accordance with the present disclosure having five or fewer layers may be represented by the construction A/B/C/D/E, wherein A is a cling layer, E is a non-cling layer, and B, C, and D, which may be the same or different polymer resins, are selected to optimize certain features of the core layer such as load containment, stretch, and puncture resistance while maintaining adequate tear propagation. An illustrative embodiment with three layers may be represented by the construction A/B/E, A/C/E, or A/D/E. An illustrative embodiment with seven layers may be represented by the construction $A/B/C_1/C_2/C_3/D/E$. Those skilled in the art will appreciate that various layer combinations and compositions are possible. For example, an illustrative film $A/B/C_1/C_2/C_3/D/E$ may have five identical core layers, i.e., B, $C_1$, $C_2$, $C_3$, and D are identical, or five different core layers, i.e., B, $C_1$, $C_2$, $C_3$, and D are each different, or three identical core layers, i.e., $C_1$, $C_2$, and $C_3$ are identical and B and D are each different, and so on and so forth. Alternatively, a seven layer film may have four core layers, $B/C_1/C_2/C_3$, and two adjoining non-cling layers, D/E, and a cling layer A.

The total thickness or gauge of a multi-layer stretch film in accordance with the present disclosure may vary depending on the intended application for the film. It will be appreciated by those skilled in the art that the thickness of each individual layer may be similar or different in addition to having similar or different compositions. The thickness of each layer is therefore independent and may vary within the parameters set by the total thickness of the film. Illustratively, a film having the construction A/B/C/D/E may preferably have corresponding percentage by weight thicknesses of 10/15/45/10/20 of the total thickness of the film. Alternatively, a film having the construction A/B/C/D/E may preferably have corresponding percentage by weight thicknesses of 10/10/60/10/10 of the total thickness of the film. Further, a film having the construction A/B/C/D/E may preferably have corresponding percentage by weight thicknesses of 5/10/50/10/25 of the total thickness of the film. The construction A/C/E may preferably have corresponding percentage thicknesses of 10/70/20. The construction $A/B/C_1/C_2/C_3/D/E$ may preferably have corresponding thicknesses of 10/15/15/15/15/10/20. Those skilled in the art will appreciate that various layer combinations and thicknesses are possible.

The multi-layer stretch films in accordance with the present disclosure are typically manufactured by cast film or feed block co-extrusion. Alternatively, the stretch films of the present disclosure may be made by blown film (tubular) co-extrusion. Methods for cast film, feed block and blown film extrusion are disclosed in The Wiley Encyclopedia of Packaging Technology, Aaron L. Brody et al. eds., 2nd Ed. 1997, pp. 233-38, the disclosure of which is incorporated herein by reference in its entirety. Methods for film extrusion are also disclosed in U.S. Pat. No. 6,265,055, which is also incorporated herein by reference.

In an illustrative aspect, the cling layer of the multi-layer stretch film of the present disclosure enables the film to cling to itself when the film is wrapped on a load. The cling layer preferably constitutes from about 5% to about 40% by weight of the total thickness of the film, more preferably from about 5-15%, and most preferably about 10%. The cling layer preferably contains one or more of ultra low density polyethylene (hereinafter "ULDPE"), very low density polyethylene, plastomer, polyisobutylene, linear low density polyethylene (hereinafter "LLDPE"), and mixtures or blends thereof. Due to the enhanced non-cling (i.e., high-slip) properties of the non-cling layer in accordance with the present disclosure (see below), the cling layer preferably includes a ULDPE.

The cling layer may preferably contain from about 50% to 100%, more preferably from about 60%-90%, and most preferably from about 70%-80% by weight of an ULDPE, which is also known as very low density polyethylene. ULDPE is ethylene copolymerized with at least one $C_3$-$C_{10}$ α-olefin, more preferably a $C_8$ α-olefin. The resulting ULDPE preferably has a density ranging from about 0.885 g/cm$^3$ to about 0.920 g/cm$^3$, more preferably from about 0.888 g/cm$^3$ to about 0.910 g/cm$^3$, and a melt index ranging from 1.0 g/10 min to 20 g/10 min, more preferably ranging from about 2 g/10 min to about 10 g/10 min. In a preferred embodiment, the cling layer contains about 80% of a ULDPE that is ethylene copolymerized with a $C_8$ α-olefin with a density of about 0.900 g/cm$^3$, and a melt index of about 5.

ULDPE can be produced by a variety of processes, including gas phase, solution and slurry polymerization as disclosed in The Wiley Encyclopedia of Packaging Technology, Aaron L. Brody et al. eds., 2nd Ed. 1997, pp. 748-50, which is incorporated herein by reference in its entirety. ULDPE is typically manufactured using a Ziegler-Natta catalyst, although a number of other catalysts may be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also disclosed in U.S. Pat. Nos. 5,399,426; 4,668,752; 3,058,963; 2,905,645; 2,862,917; and 2,699,457, the contents of all of which are incorporated herein by reference in their entirety. The density of ULDPE is achieved by copolymerizing ethylene with a sufficient amount of one or more monomers. The monomers are preferably selected from 1-butene, 1-hexene, 4-methyl-1-pentene and 1-octene.

The cling layer may also include a plastomer in a range from 0% to about 100% by weight of the cling layer, more preferably from about 70%-100%, and most preferably about 80%. The plastomer is preferably ethylene copolymerized with a $C_3$-$C_{10}$ α-olefin, having a density in the range from about 0.850 g/cm$^3$ to about 0.900 g/cm$^3$, more preferably of about 0.860 g/cm$^3$ to about 0.880 g/cm$^3$, and a melt index of about 1.0 g/10 min to about 20.0 g/10 min, more preferably from about 2.0 to about 10.0 g/10 min. The cling layer preferably contains about 70%-100% plastomer with a density of about 0.875 g/cm$^3$ and a melt index of about 3.0 g/10 min. The plastomer is manufactured by the same process described above with reference to ULDPE, except that a higher amount by weight of one or more monomers is copolymerized with ethylene. In an illustrative embodiment, the plastomer is ethylene copolymerized with a $C_8$ α-olefin, which has an unstretched cling of 250 g and a 200% stretched cling of 66 g as measured by ASTM D 4649. Cling is the strength required, in grams, to pull apart overlapping film along a test section.

The multi-layer stretch films in accordance with the present disclosure include one or more core layers. The core layers or layer make up about 50% to about 90% by weight of the thickness of the film, more preferably from about 60-80%, and most preferably about 70% of the thickness of the film. Each core layer includes at least one polyolefin. Illustratively, each core layer may include an LLDPE in an amount ranging from about 97% to about 99.9% by weight of the core layer. Alternatively, each core layer may include a blend of LLDPE and polypropylene. LLDPE is manufactured by the same processes discussed above in connection with ULDPE. For example, ethylene may be copolymerized using various catalysts such as a Ziegler-Natta catalyst or a metallocene catalyst, or a combination of the aforementioned catalysts. LLDPE has a higher density than ULDPE and plastomer because it is copolymerized with a lower concentration of co-monomer than ULDPE or plastomer.

The LLDPE used in either the cling layer or the core layer is ethylene copolymerized with one or more $C_3$-$C_{10}$ α-olefins, with a density ranging from about 0.900 g/cm$^3$ to about 0.940 g/cm$^3$, more preferably from about 0.910 g/cm$^3$ to about 0.930 g/cm$^3$, and a melt index ranging from about 1.0 to about 20.0 g/10 min., more preferably from about 1.5 to about 6.0 g/10 min. Similar to the ULDPE discussed above, LLDPE used in the films of the present disclosure is preferably ethylene copolymerized with one monomer of 1-butene, 1-hexene, 4-methyl-1-pentene, or 1-octene. LLDPE may alternatively contain more than one co-monomer selected from α-olefins such as 1-butene, 1-hexene, 4-methyl-1-pentene, and/or 1-octene. The core layer preferably contains about 97% to about 99.9% of LLDPE that is ethylene copolymerized with a $C_8$ α-olefin, with a density of 0.917 g/cm$^3$ and a melt index of 4.0 g/10 min.

Illustratively, each core layer may include a blend of LLDPE and polypropylene. The polypropylene may be a homopolymer or may be the product of propylene copolymerization with a co-monomer, preferably ethylene. Alternatively, propylene may be copolymerized with another co-monomer, such as a $C_3$-$C_{10}$ α-olefin. The polypropylene of the present disclosure may be a copolymer of propylene and ethylene, the ethylene content ranging from 0 to about 10% by weight of the copolymer, or from about 2% to about 6% by weight. An illustrative embodiment has propylene copolymerized with a mixture of α-olefins, the α-olefin content ranging from about 2% to about 4% by weight in a polymer known as random copolymer polypropylene. The random copolymer of polypropylene may have a density of about 0.905 g/cm$^3$ and a melt flow rate of about 7.0 g/10 min. The method for measuring polypropylene melt flow rate is disclosed in The Wiley Encyclopedia of Packaging Technology (Aaron L. Brody et al. eds., 2nd Ed. 1997), p. 677 and methods for manufacturing polypropylene are disclosed in Kirk-Othmer Concise Encyclopedia of Chemical Technology pp. 1420-21 (Jacqueline I. Kroschwitz et al. eds., 4th Ed. 1999), the disclosures of which are incorporated herein by reference in their entirety.

The density ranges and melt indexes as disclosed herein for ULDPE and LLDPE and for plastomer and ULDPE partially overlap. However, these polymers may be further distinguished by crystallinity, measured as melt point. A ULDPE with the same melt index and density of LLDPE will have a lower melt point than LLDPE as disclosed herein. Similarly, a plastomer with the same density and melt index of a ULDPE, will have a lower melt point than ULDPE.

The multi-layer stretch films in accordance with the present disclosure further include a non-cling or slip layer that preferably makes up about 5-40% by weight of the total film thickness, more preferably from about 15-30%, and most preferably about 20%. The non-cling layer is preferably composed of a mixture of polyethylene and polystyrene. The polyethylene-based non-cling layer may have a density ranging from about 0.890 g/cm$^3$ to about 0.910 g/cm$^3$, more preferably from about 0.895 g/cm$^3$ to about 0.905 g/cm$^3$ and a melt flow rate from about 2.0 g/10 min to about 40.0 g/10 min. In an illustrative multilayer stretch film, the non-cling layer is preferably composed of from about 40-80% by weight of low density polyethylene (hereinafter "LDPE"), from about 10-30% by weight of LLDPE, and from about 1%-25% by weight of polystyrene.

An unexpected feature of the multi-layer stretch films in accordance with the present disclosure is their display of enhanced non-cling properties (i.e., exceptional slipperiness) after being stretched. More particularly, the stretch films described herein are not appreciably slippery until after they are stretched, thereby permitting thick films (e.g., 3.0-mil films) requiring substantial stretching force (e.g., >200 lb) to be stretched that would otherwise slip through stretching equipment (without being stretched) due to inherent pre-stretch slipperiness. Multi-layer stretch films known in the prior art that include polypropylene-based non-cling or slip layers display such inherent pre-stretch slipperiness, rather than enhanced post-stretch slipperiness.

Illustratively, the LDPE of the non-cling layer may have a density ranging from about 0.900 g/cm$^3$ to about 0.940 g/cm$^3$, more preferably from about 0.920 g/cm$^3$ to about 0.930 g/cm$^3$ and a melt index ranging from about 0.10 g/10 min to about 10.0 g/10 min, more preferably from about 0.3 g/10 min to about 0.7 g/10 min. LDPE is generally used for heavy bags, such as ice bags or shipping sacks, which normally have a thickness of from about 1.5 mil to about 4.0 mil. A mil is a unit of distance equivalent to 0.001 inch (or 25.4 microns). As used in the non-cling layer, the LDPE may be ethylene homopolymer or ethylene copolymerized with one or more monomers, such as vinyl acetate, butyl acrylate, methyl acrylate, acrylic acid, ethyl acrylate, or a $C_3$-$C_{10}$ α-olefin. The LDPE is preferably ethylene homopolymer with a density of about 0.923 g/cm$^3$ and a melt index of about 0.6-9.0 g/10 min. An alternative embodiment of the stretch film contains an LDPE that is a copolymer. Methods for manufacturing LDPE are disclosed in The Wiley Encyclopedia of Packaging Technology, Aaron L. Brody et al. eds., 2nd Ed. 1997, pp. 753-754, and in U.S. Pat. No. 5,399,426, the contents of which are hereby incorporated herein by reference in their entirety.

The amount of each polymer included in the multi-layer stretch films in accordance with the present disclosure is selected to create an optimal balance of several physical properties. The stretch films described herein balance increased load, holding containment and stretch with clarity, puncture resistance and resistance to tear propagation. The stretch films described herein have a non-cling layer that includes LLDPE in combination with a large amount (relatively speaking) of LDPE. LDPE typically provides good load containment, stretch and necked-in width. The amount of LDPE in the non-cling layer is a substantial percentage, however, i.e., in the range of 40% to about 80%, which would be expected to reduce the film's puncture resistance, resistance to tear propagation and clarity. It is thus also unexpected that the multi-layer stretch films of the present disclosure optimize load containment and stretch, while also optimizing puncture resistance and clarity.

The overall thickness of the multi-layer stretch films in accordance with the present disclosure can be varied depending on the particular end use for which the film is manufactured. The stretch films of the present disclosure have a thickness that is generally in the range of typical thickness for stretch wrap films, but may be easily adjusted by one skilled in the art to fit the desired end use. It has been discovered that the greatest benefits from the balance of properties of the present disclosure are found in gauges ranging from about 40 gauge to about 500 gauge. Even more beneficial are the properties of the film of the present disclosure at gauges ranging from about 60 gauge to about 250 gauge. At these gauge ranges, it has been discovered that the film performs better than prior art films. Therefore, the films of the present disclosure preferably have a thickness ranging from about 0.4 mils to about 5.0 mils and more preferably from about 0.6 mils to about 2.5 mils.

Additives may be added to any of the film layers described herein in order to improve certain characteristics of the particular layer or to meet special requirements of specific applications. One or more additives may be added in amounts ranging from about 0%-99% by weight of the preferred first layer, second layer, third layer or other individual layer, more preferably from about 0-10% by weight, and most preferably from about 0.1-1.5% by weight. Illustrative additives include color concentrates, slip agents, antiblocking agents, fillers, and specialty additives for specific applications.

A color concentrate may be added to any of the film layers described herein in order to yield a colored layer, an opaque layer, or a translucent layer. Illustrative color concentrates include color formulations including black, especially carbon black, white, and other colors suitable for agricultural films such as those manufactured by Ampacet Corporation (Tarrytown, N.Y.). Illustrative color concentrates include Ampacet® white UV PE masterbatch, the carrier resin of which being a LDPE having a melt index of 12 g/10 min at 190° C. and a density of 0.916 gm/cm$^3$ and the concentrate of which has a nominal specific gravity of 1.79, a melt index of 2-8 g/10 min at 190° C. and a pigment composed of 65% $TiO_2$. Another illustrative color concentrate includes Ampacet® black PE masterbatch, the carrier resin of which being a LLDPE having a nominal melt index of 20 g/10 min at 190° C. and a density of 0.92 gm/cm$^3$. The concentrate has a nominal specific gravity of 1.15, a melt index of <6 g/10 min at 190° C., and a pigment composed of 40% carbon black. Another illustrative color concentrate includes Ampacet® black UV PE masterbatch, the carrier resin of which being a LDPE or LLDPE having a nominal melt index of 24 g/10 min at 190° C. and a density of 0.92 gm/cm$^3$. The concentrate has a specific gravity of 1.14, a melt index of 4-10 gm/cm$^3$ at 190° C., and contains about 40% carbon black. Any suitable color concentrate may be used in accordance with the present disclosure in order to satisfy particular requirements for a film being produced in accordance with the present disclosure.

Illustrative slip agents include stearamide, oleamide, and erucamide. A particularly preferred slip agent is Ampacet® Slip PE masterbatch having a LDPE carrier resin with an 8 g/10 min melt index at 190° C. and a density of 0.918 gm/cm$^3$. The slip agent's concentrate has a nominal specific gravity of 0.92, a nominal melt index of 10-16 g/10 min and contains 5% erucamide. Slip agents may be used alone or in combination with antiblocking agents. An illustrative slip/antiblock combination is Ampacet® Slip AB PE masterbatch having a LDPE carrier resin with an 8 g/10 min melt index at 190° C. and a density of 0.92 gm/cm$^3$. The slip agent's concentrate has a nominal specific gravity of 0.93, a nominal melt index of 5-14 g/10 min at 190° C. and contains 2% slip agent and 2% antiblock. An antiblocking agent alone may also be added to a layer. Illustrative antiblocking agents include organic polymers such as polyamides, polycarbonates, polyesters.

The present disclosure is further illustrated by the following examples, which are not to be construed in any way as imposing limitations upon the scope thereof. On the contrary, resort may be had to various other embodiments, modifications, and equivalents thereof which, after reading the description herein, may suggest themselves to those skilled in the art without departing from the spirit of the present disclosure and/or the scope of the appended claims.

EXAMPLES

Example 1

A multilayer stretch film with superior cling and abrasion resistance having a total film thickness of about 1.0 mils was produced using the formula set forth in Table 1 wherein layer A is the slip or non-cling layer, layer B is the core layer, and layer C is the cling layer.

TABLE 1

Formulation 1.

| Layer | Ratio | Wt % | Type | Mfr | MFR | MI | Density |
|---|---|---|---|---|---|---|---|
| A | 20% | 60.0 | Homopolymer Polypropylene | Dow | 8.7 | | |
| | | 38.0 | Random Copolymer Polypropylene | Dow | 7.0 | | |
| | | 2.0 | Polystyrene | Dow | 1.5 | | |
| B | 70% | 95.0 | LLDPE | Voridian | | 4 | 0.917 |
| | | 5.0 | LDPE | Dow | | 0.6 | 0.923 |
| C | 10% | 100.0 | Plastomer | Dow | | 3.0 | 0.875 |

Example 2

A multilayer stretch film with superior cling and abrasion resistance having a total film thickness of about 2.0 mils is produced using the formula set forth in Table 2 wherein layer A is the slip or non-cling layer, layer B is the core layer, and layer C is the cling layer.

TABLE 2

Formulation 2.

| Layer | Ratio | Wt % | Type | Mfr | MFR | MI | Density |
|---|---|---|---|---|---|---|---|
| A | 20% | 60.0 | Homopolymer Polypropylene | Dow | 8.7 | | |
| | | 38.0 | Random Copolymer Polypropylene | Dow | 7.0 | | |
| | | 2.0 | Polystyrene | Dow | 1.5 | | |
| B | 70% | 95.0 | LLDPE | Voridian | | 4.0 | 0.917 |
| | | 5.0 | LDPE | Dow | | 0.6 | 0.923 |
| C | 10% | 80.0 | Plastomer | Dow | | 3.0 | 0.875 |
| | | 20.0 | ULDPE | Dow | | 5.0 | 0.900 |

A multilayer stretch film with superior cling and abrasion resistance was produced using the formula set forth in Table 3 wherein layer A is the slip or non-cling layer, layer B is the core layer, and layer C is the cling layer. The film produced by formula 3, and in particular the slip layer, had inferior non-cling properties (i.e., slipperiness) compared to Formulae 1, 2, and 4 which were abrasion resistant.

TABLE 3

Formulation 3.

| Layer | Ratio | Wt % | Type | Mfr | MFR | MI | Density |
|---|---|---|---|---|---|---|---|
| A | 20% | 100% | Random Copolymer Polypropylene | | | | |
| B | 70% | 95% | LLDPE | Voridian | | 4.0 | 0.917 |
| | | 5% | LDPE | Dow | | 0.6 | 0.923 |
| C | 10% | 80% | Plastomer | Dow | | 3.0 | 0.875 |
| | | 20% | ULDPE | Dow | | 5.0 | 0.900 |

Example 4

A multilayer stretch film with superior cling and abrasion resistance as well as enhanced post-stretch non-cling properties (i.e., slipperiness) having a total film thickness of about 1.0 mils is produced using the formula set forth in Table 3 wherein layer A is the slip or non-cling layer, layer B is the core layer, and layer C is the cling layer.

TABLE 4

Formulation 4.

| Layer | Ratio | Wt % | Type | Mfr | MFR | MI | Density |
|---|---|---|---|---|---|---|---|
| A | 15% | 69.5% | LDPE | | | | |
| | | 20% | LLDPE | | | | |
| | | 10% | Polystyrene | | | | |
| | | 0.5% | Masterbatch | | | | |
| B | 75% | 65% | mLLDPE | | | | |
| | | 35% | LLDPE | | | | |
| C | 10% | 79.5% | ULDPE | | | | |
| | | 20% | mLLDPE | | | | |
| | | 0.5% | Masterbatch | | | | |

Example 5

A multilayer stretch film was produced using the formula set forth in Table 5 wherein layer A is the slip or non-cling layer, layer B is the core layer, and layer C is the cling layer. The film produced by formula 5 machined well but had inferior abrasion resistance (no abrasion resistance).

TABLE 5

Formulation 5.

| Layer | Ratio | Wt % | Type | Mfr | MFR | MI | Density |
|---|---|---|---|---|---|---|---|
| A | 20% | 100% | LDPE | | | | |
| B | 70% | 95% | LLDPE | Voridian | | 4.0 | 0.917 |
| | | 5% | LDPE | Dow | | 0.6 | 0.923 |
| C | 10% | 80% | Plastomer | Dow | | 3.0 | 0.875 |
| | | 20% | ULDPE | Dow | | 5.0 | 0.900 |

The foregoing description of illustrative embodiments of the present disclosure has been presented for purposes of illustration and description, and is not intended to be exhaustive or to limit the disclosure to the precise form disclosed. The description was selected to best explain the principles of the disclosure and practical application of these principles to enable others skilled in the art to best use the disclosure in various embodiments and modifications as are suited to the particular use contemplated. It is intended that the scope of the disclosure not be limited by the specification, but be defined by the claims set forth below.

The invention claimed is:

1. A multilayer stretch film comprising
a non-cling layer comprising (i) 50-99% by weight of the layer of a polyethylene blend comprising low density polyethylene (LDPE) and linear low density polyethylene (LLDPE) and (ii) polystyrene,
a core layer comprising at least one polyolefin, and
a cling layer comprising ultra-low density polyethylene, very low density polyethylene, polyisobutylene, linear low density polyethylene, or mixtures thereof,
wherein the non-cling layer is more slippery when the multilayer stretch film is in a stretched state compared to the non-cling layer when the multilayer stretch film is in an unstretched state.

2. The multilayer stretch film of claim 1, wherein the non-cling layer comprises 10-30% by weight of the non-cling layer of LLDPE.

3. The multilayer stretch film of claim 2, wherein the polystyrene is present in the non-cling layer at about 1% to about 25% by weight of the non-cling layer.

4. The multilayer stretch film of claim 3, wherein the non-cling layer comprises about 10% to about 25% by weight of the non-cling layer of polystyrene.

5. The multilayer stretch film of claim 1, wherein the non-cling layer comprises about 10% by weight of the non-cling layer of polystyrene.

6. The multilayer stretch film of claim 5, wherein the non-cling layer comprises about 0.1% to about 1.5% by weight of additives based on the weight of the non-cling layer.

7. The multilayer stretch film of claim 1, wherein the multilayer stretch film has a thickness of about 0.4 mils to about 5 mils.

8. The multilayer stretch film of claim 7, wherein the thickness is about 2.5 mils to about 5 mils.

9. The multilayer stretch film of claim 8, wherein the thickness is about 3 mils to about 5 mils.

10. The multilayer stretch film of claim 7, wherein a stretching force of greater than about 200 pounds is applied to the multilayer stretch film to elongate the multilayer stretch film from the unstretched state to the stretched state.

11. The multilayer stretch film of claim 1, wherein the non-cling layer is about 5%-40% by weight of the film.

12. The multilayer stretch film of claim 11, wherein the core layer is about 50%-90% by weight of the film.

13. The multilayer stretch film of claim 12, wherein the cling layer is about 5%-40% by weight of the film.

14. The multilayer stretch film of claim 13, wherein the core layer comprises about 97% to about 100% by weight of the core layer of LLDPE linear low density polyethylene.

15. The multilayer stretch film of claim 14, wherein a thickness of the multilayer stretch film is about 2.5 mils to about 5.0 mils, wherein a stretching force of greater than about 200 pounds is applied to the multilayer stretch film to elongate the multilayer stretch film from the unstretched state to the stretched state, wherein the non-cling layer comprises about 2.5% to about 25% by weight of the non-cling layer of polystyrene, and the polyethylene blend of the non-cling layer comprises about 10% to about 30% by weight of the non-cling layer of LLDPE.

16. A multilayer stretch film comprising
a non-cling layer comprising polyethylene and polystyrene,
a core layer comprising at least one polyolefin, and
a cling layer comprising ultra-low density polyethylene, very low density polyethylene, polyisobutylene, linear low density polyethylene, or mixtures thereof,
wherein the non-cling layer is more slippery when the multilayer stretch film is in a stretched state compared to the non-cling layer when the multilayer stretch film is in an unstretched state, and
wherein the non-cling layer is free of polypropylene.

17. The multilayer stretch film of claim 16, wherein the polyethylene of the non-cling layer is a blend comprising LDPE and LLDPE.

18. A multilayer stretch film comprising
a non-cling layer comprising 50-99% by weight polyethylene and 1-25% by weight polystyrene, based on the weight of the non-cling layer,
a core layer comprising at least one polyolefin, and
a cling layer comprising ultra-low density polyethylene, very low density polyethylene, polyisobutylene, linear low density polyethylene, or mixtures thereof,
wherein the non-cling layer is more slippery when the multilayer stretch film is in a stretched state compared to the non-cling layer when the multilayer stretch film is in an unstretched state.

19. The multilayer stretch film of claim 18, wherein the polyethylene of the non-cling layer is a blend comprising LDPE and LLDPE.

* * * * *